US007725797B2

(12) United States Patent
Ver Steeg

(10) Patent No.: US 7,725,797 B2
(45) Date of Patent: May 25, 2010

(54) BUFFER FOR STORING DATA AND FORWARD ERROR CORRECTION (FEC)

(75) Inventor: William C. Ver Steeg, Alpharetta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 954 days.

(21) Appl. No.: 11/482,437

(22) Filed: Jul. 7, 2006

(65) Prior Publication Data

US 2008/0022190 A1 Jan. 24, 2008

(51) Int. Cl.
*H03M 13/00* (2006.01)

(52) U.S. Cl. ........................................ 714/751

(58) Field of Classification Search ................. 714/746, 714/776, 748, 751–752; 370/390, 312
See application file for complete search history.

(56) References Cited

U.S. PATENT DOCUMENTS

| | | | | |
|---|---|---|---|---|
| 5,572,347 | A | 11/1996 | Burton et al. | 359/124 |
| 5,594,509 | A | 1/1997 | Florin et al. | 348/731 |
| 5,600,663 | A | 2/1997 | Ayanouglu et al. | 371/41 |
| 5,633,683 | A | 5/1997 | Rosengren et al. | 348/385 |
| 5,699,365 | A | 12/1997 | Klayman et al. | 371/55 |
| 5,699,369 | A | 12/1997 | Guha | 371/41 |
| 5,790,546 | A | 8/1998 | Dobbins et al. | 370/400 |
| 5,808,662 | A | 9/1998 | Kinney et al. | 348/15 |
| 5,815,145 | A | 9/1998 | Matthews | 345/327 |
| 5,913,031 | A | 6/1999 | Blanchard | 395/200.34 |
| 5,949,795 | A | 9/1999 | Moroney et al. | 370/516 |
| 6,016,166 | A | 1/2000 | Huang et al. | 348/515 |
| 6,118,498 | A | 9/2000 | Reitmeier | 348/725 |
| 6,173,115 | B1 | 1/2001 | Willis | 386/125 |
| 6,252,849 | B1 | 6/2001 | Rom et al. | 370/230 |
| 6,278,716 | B1 | 8/2001 | Rubenstein et al. | |
| 6,307,839 | B1 | 10/2001 | Gerszberg et al. | 370/235 |

(Continued)

FOREIGN PATENT DOCUMENTS

WO WO 99/09741 2/1999

(Continued)

OTHER PUBLICATIONS

Rubenstein et al., Improving reliable multicast using active parity encoding services (APES), 1999, IEEE, p. 1248-1255.*

(Continued)

*Primary Examiner*—Shelly A Chase
(74) *Attorney, Agent, or Firm*—Merchant & Gould

(57) ABSTRACT

Systems and methods are disclosed herein for transmitting data packets through a communication system. In one of several embodiments, a communication device in the communication system comprises a buffer configured to store a stream of data packets and forward error correction (FEC) code associated with the stream of data packets. The communication device also includes a processor configured to control the transmission of the stream of data packets and FEC code to a receiver device located downstream on the communication system. The processor is further configured to wait a predetermined period of time, after transmitting the stream of data packets and a portion of the FEC code, to determine whether or not the receiver device requests for additional FEC code.

18 Claims, 5 Drawing Sheets

U.S. PATENT DOCUMENTS

| | | | | |
|---|---|---|---|---|
| 6,453,471 | B1 | 9/2002 | Klosterman | 725/41 |
| 6,480,541 | B1 | 11/2002 | Girod et al. | 375/240.12 |
| 6,510,553 | B1 | 1/2003 | Hazra | 725/87 |
| 6,594,798 | B1 | 7/2003 | Chou et al. | |
| 6,628,301 | B1 | 9/2003 | Acton et al. | 345/716 |
| 6,665,751 | B1 | 12/2003 | Chen et al. | 710/52 |
| 6,701,528 | B1 | 3/2004 | Arsenault et al. | 725/89 |
| 6,763,019 | B2 | 7/2004 | Mehta et al. | 725/88 |
| 6,973,667 | B2 | 12/2005 | Fritsch | 725/88 |
| 7,017,102 | B1 | 3/2006 | Kristensson et al. | 714/786 |
| 7,054,643 | B2 | 5/2006 | Trossen et al. | 455/454 |
| 7,065,779 | B1 | 6/2006 | Crocker et al. | 725/111 |
| 7,073,117 | B1 | 7/2006 | Ireland et al. | 714/786 |
| 7,096,481 | B1 | 8/2006 | Forecast et al. | 725/32 |
| 7,113,484 | B1 | 9/2006 | Chapman et al. | 370/252 |
| 7,114,172 | B2 | 9/2006 | Lord | 725/80 |
| 7,228,356 | B2 | 6/2007 | Nguyen et al. | 709/231 |
| 7,266,127 | B2 | 9/2007 | Gupta et al. | 370/413 |
| 7,281,058 | B1 | 10/2007 | Shepherd et al. | 709/238 |
| 7,433,946 | B2 | 10/2008 | Shen et al. | 709/234 |
| 7,447,978 | B2 * | 11/2008 | Hannuksela | 714/776 |
| 7,584,404 | B2 | 9/2009 | Kozintsev et al. | 714/776 |
| 7,610,606 | B2 | 10/2009 | Carlucci et al. | 725/95 |
| 2001/0025378 | A1 | 9/2001 | Sakamoto et al. | 725/93 |
| 2002/0019853 | A1 | 2/2002 | Vange et al. | 709/245 |
| 2002/0056107 | A1 | 5/2002 | Schlack et al. | 725/35 |
| 2002/0057367 | A1 | 5/2002 | Baldock | 348/554 |
| 2002/0067909 | A1 | 6/2002 | Iivonen | 386/88 |
| 2002/0129129 | A1 | 9/2002 | Bloch et al. | 717/175 |
| 2002/0181454 | A1 | 12/2002 | Norman et al. | 370/389 |
| 2002/0199203 | A1 | 12/2002 | Duffy et al. | 725/109 |
| 2003/0007212 | A1 | 1/2003 | Sala et al. | 398/72 |
| 2003/0007507 | A1 | 1/2003 | Rajwan et al. | 370/468 |
| 2003/0007508 | A1 | 1/2003 | Sala et al. | 370/468 |
| 2003/0007724 | A1 | 1/2003 | Gummalla et al. | 385/24 |
| 2003/0014752 | A1 | 1/2003 | Zaslavsky et al. | 725/40 |
| 2003/0048808 | A1 | 3/2003 | Stahl et al. | 370/487 |
| 2003/0133458 | A1 | 7/2003 | Sato et al. | 370/395 |
| 2003/0156218 | A1 | 8/2003 | Laksono | 709/231 |
| 2003/0159143 | A1 | 8/2003 | Chan | 725/41 |
| 2003/0188253 | A1 | 10/2003 | Kauschke et al. | 714/755 |
| 2003/0188311 | A1 | 10/2003 | Yuen et al. | 725/42 |
| 2003/0196211 | A1 | 10/2003 | Chan | 725/131 |
| 2003/0200551 | A1 | 10/2003 | Kang | 725/120 |
| 2003/0217365 | A1 | 11/2003 | Caputo | 725/95 |
| 2004/0111470 | A1 | 6/2004 | Poulsen et al. | 709/204 |
| 2004/0133907 | A1 | 7/2004 | Rodriguez et al. | 725/14 |
| 2004/0184776 | A1 | 9/2004 | Inoue et al. | 386/83 |
| 2004/0194147 | A1 | 9/2004 | Craven et al. | 725/111 |
| 2004/0204945 | A1 | 10/2004 | Okuda et al. | 704/500 |
| 2004/0226044 | A1 | 11/2004 | Goode | 725/95 |
| 2004/0228277 | A1 | 11/2004 | Williams | 370/230 |
| 2004/0260814 | A1 | 12/2004 | Budge et al. | 709/227 |
| 2005/0166242 | A1 | 7/2005 | Matsumoto et al. | 725/88 |
| 2005/0190781 | A1 | 9/2005 | Green et al. | 370/432 |
| 2005/0204251 | A1 | 9/2005 | Moon et al. | |
| 2005/0228892 | A1 | 10/2005 | Riley et al. | 709/228 |
| 2005/0289618 | A1 | 12/2005 | Hardin | 725/95 |
| 2005/0289623 | A1 | 12/2005 | Midani et al. | 725/100 |
| 2006/0013247 | A1 | 1/2006 | Kotch et al. | 370/437 |
| 2006/0074968 | A1 | 4/2006 | Gyetko | 707/102 |
| 2006/0080707 | A1 | 4/2006 | Laksono | 725/38 |
| 2006/0236358 | A1 | 10/2006 | Liu et al. | 725/117 |
| 2006/0242240 | A1 | 10/2006 | Parker et al. | 709/205 |
| 2007/0044130 | A1 | 2/2007 | Skoog | 725/110 |
| 2007/0098015 | A1 | 5/2007 | Eijsberg | 370/468 |
| 2007/0104226 | A1 | 5/2007 | Ver Steeg et al. | 370/485 |
| 2007/0106782 | A1 | 5/2007 | Ver Steeg et al. | 709/224 |
| 2007/0107023 | A1 | 5/2007 | Ver Steeg et al. | 725/95 |
| 2007/0107024 | A1 | 5/2007 | Ver Steeg et al. | 725/95 |
| 2007/0130393 | A1 | 6/2007 | Ver Steeg | 710/57 |
| 2007/0186228 | A1 | 8/2007 | Ramaswamy et al. | 725/14 |
| 2007/0192812 | A1 | 8/2007 | Pickens et al. | 725/94 |
| 2007/0220577 | A1 | 9/2007 | Kongalath | 725/131 |
| 2007/0261087 | A1 | 11/2007 | Denney et al. | 725/95 |
| 2008/0008167 | A1 | 1/2008 | Ver Steeg | 370/389 |
| 2008/0022320 | A1 | 1/2008 | Ver Steeg | 725/78 |
| 2008/0028279 | A1 | 1/2008 | Ver Steeg | 714/776 |
| 2008/0028280 | A1 | 1/2008 | Ver Steeg | 714/776 |
| 2008/0109692 | A1 | 5/2008 | Ver Steeg | 714/746 |
| 2008/0134005 | A1 | 6/2008 | Izzat et al. | 714/774 |
| 2008/0229379 | A1 | 9/2008 | Akhter | 725/139 |
| 2008/0244667 | A1 | 10/2008 | Osborne | 725/94 |
| 2008/0244679 | A1 | 10/2008 | Sukumar et al. | 725/121 |
| 2009/0007199 | A1 | 1/2009 | La Joie | 725/95 |
| 2009/0031342 | A1 | 1/2009 | Ver Steeg et al. | 725/38 |
| 2009/0031392 | A1 | 1/2009 | Ver Steeg et al. | 725/151 |
| 2010/0046634 | A1 | 2/2010 | Dai et al. | 375/240.25 |

FOREIGN PATENT DOCUMENTS

| | | |
|---|---|---|
| WO | WO 2005/020556 | 3/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

Jean-Louis Gauvreau, et al: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.

Fitzek F. et al. "Error Control Techniques for Efficient Multicast Streaming in UMTS Networks" Proceedings of Systemics, Cybernetics and Informatics SCI 2003 [Online] 2003, XP002477506 Orlando, Florida USA. Retrieved from the Internet URL:http://kom.aau.dk/{ff/documents/SCI_2003.pdf> [retrieved on Apr. 21, 2008] pp. 4-5, figure 4.

Rammler R. et al. "Performance of Parity-Based Loss Recovery for Reliable Multicast in Third-Generation Mobile Networks" Personal, Indoor and Mobile Radio Communications, 2005. PIMRC 2005. IEEE $16^{TH}$ International Symposium on Berlin, Germany Sep. 11-14, 2005, Piscataway, NJ, USA, IEEE, Sep. 11, 2005, pp. 1641-1645, XP010926492.

Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.

Lacher, M.S. et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.

U.S. Appl. No. 11/482,439, filed Jul. 7, 2006, Entitled "Determining Strategy for Multicast and/or Unicast Transmission to Correct Forward Errors." Inventor: William C. Ver Steeg.

U.S. Appl. No. 11/482,438, filed Jul. 7, 2006, Entitled "Transmitting Additional Forward Error Correction (FEC) Upon Request." Inventor: William C. Ver Steeg.

U.S. Appl. No. 11/482,436, filed Jul. 7, 2006, Entitled "Requesting Additional Forward Error Correction." Inventor: William C. Ver Steeg.

U.S. Appl. No. 11/550,441, filed Oct. 18, 2006, Entitled "Reducing Channel-Change Time." Inventor: William C. Ver Steeg.
De M Cordeiro C. et al. "Establishing a Trade-off Between Unicast and Multicast Retransmission Modes for Reliable Multicast Protocols." Modeling, Analysis and Simulation of Computer and Telecommunication Systems, Aug. 29, 2000, pp. 85-91, XP010515402.
Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.
Lee, Min Jeong et al. "Performance Improvements of Wireless IP Multicast Conference System based on Designated Receivers." IEEE International Conference on Atlanta, GA, USA, vol. 2, Jun. 7, 1998-Jun. 11, 1998, pp. 807-811, XP010284688.
Nonnenmacher, J. et al. "Parity-Based Loss Recovery for Reliable Multicast Transmission." IEEE/ACM Transactions on Networking, vol. 6, No. 4, Aug. 1998, pp. 349-361, XP000771969.
Paul, Sanjoy et al. "Reliable Multicast Transport Protocol (RMTP)" IEEE Journal on Selected Areas in Communications, vol. 15, No. 3, Apr. 1997, XP011054624.
Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.
European Patent Application, EP 0 714 192, Nov. 24, 1994.
European Patent Application, EP 1 294 193, Sep. 9, 2002.
European Patent Application, EP 1 335 521, Oct. 24, 2002.
European Patent Application, EP 1 589 706, Apr. 19, 2004.
European Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Feb. 22, 2008 in U.S. Appl. No. 11/164,147.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Jul. 11, 2008 in U.S. Appl. No. 11/164,110.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Sep. 26, 2008 in U.S. Appl. No. 11/164,147.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 8, 2009 in U.S. Appl. No. 11/164,110.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 18, 2009 in U.S. Appl. No. 11/164,147.
U.S. Official Action dated Mar. 24, 2009 in U.S. Appl. No. 11/164,102.
U.S. Official Action dated Apr. 29, 2009 in U.S. Appl. No. 11/692,457.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 11, 2008 in U.S. Appl. No. 11/164,110.
U.S. Official Action dated Jul. 17, 2009 in U.S. Appl. No. 11/164,119.
U.S. Official Action dated Jul. 27, 2009 in U.S. Appl. No. 11/164,147.
U.S. Official Action dated Jul. 31, 2009 in U.S. Appl. No. 11/482,439.
U.S. Official Action dated Aug. 5, 2009 in U.S. Appl. No. 11/164,115.
U.S. Official Action dated Aug. 5, 2009 in U.S. Appl. No. 11/164,110.
U.S. Official Action dated Aug. 18, 2009 in U.S. Appl. No. 11/164,102.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Oct. 20, 2009 in U.S. Appl. No. 11/692,457.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 10, 2008, PCT/US08/070853.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Sherer, et al. "Appendix A Low Bandwidth Low Latency Channel Change," U.S. Appl. No. 60/719,146, filed Sep. 21, 2005.
Shoaf et al. "IGMP Capabilities in Broadband Network Architercures", Whitepaper Juniper Networks, Mar. 1, 2005, pp. 1-25, XP002999116, pp. 1-31.
Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China, Oct. 28-31, 2002; New York, NY, vol. 1, Oct. 28, 2002, pp. 306-309, XP010628485, ISBN: 978-0-7803-7490-4.
U.S. Official Action dated Jan. 29, 2010 in U.S. Appl. No. 11/692,457 642.
U.S. Official Action dated Feb. 19, 2010 in U.S. Appl. No. 11/164,147.
U.S. Official Action dated Feb. 26, 2010 in U.S. Appl. No. 11/482,438.
International Preliminary Report dated Feb. 2, 2010, PCT/US2008/070851.
International Preliminary Report dated Feb. 2, 2010, PCT/US2008/070853.
Canadian Office Action dated Feb. 8, 2010, Application No. 2,663,907.
U.S. Official Action dated Nov. 23, 2009 in U.S. Appl. No. 11/164,115.
U.S. Official Action dated Nov. 24, 2009 in U.S. Appl. No. 10/119,700.
U.S. Official Action dated Dec. 21, 2009 in U.S. Appl. No. 11/428,336.
U.S. Official Action dated Jan. 6, 2010 in U.S. Appl. No. 11/691,565.
U.S. Official Action dated Jan. 14, 2010 in U.S. Appl. No. 11/164,110.
U.S. Official Action dated Jan. 22, 2010 in U.S. Appl. No. 11/164,119.
U.S. Official Action dated Mar. 19, 2010 in U.S. Appl. No. 11/550,441.

* cited by examiner

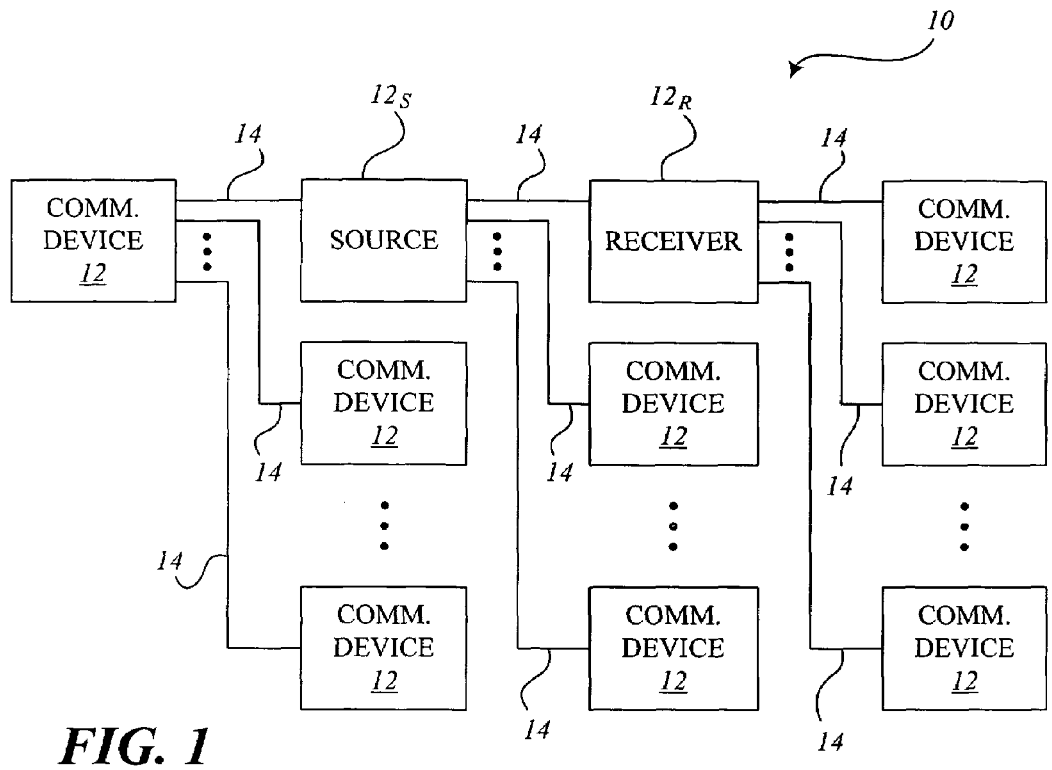
FIG. 1
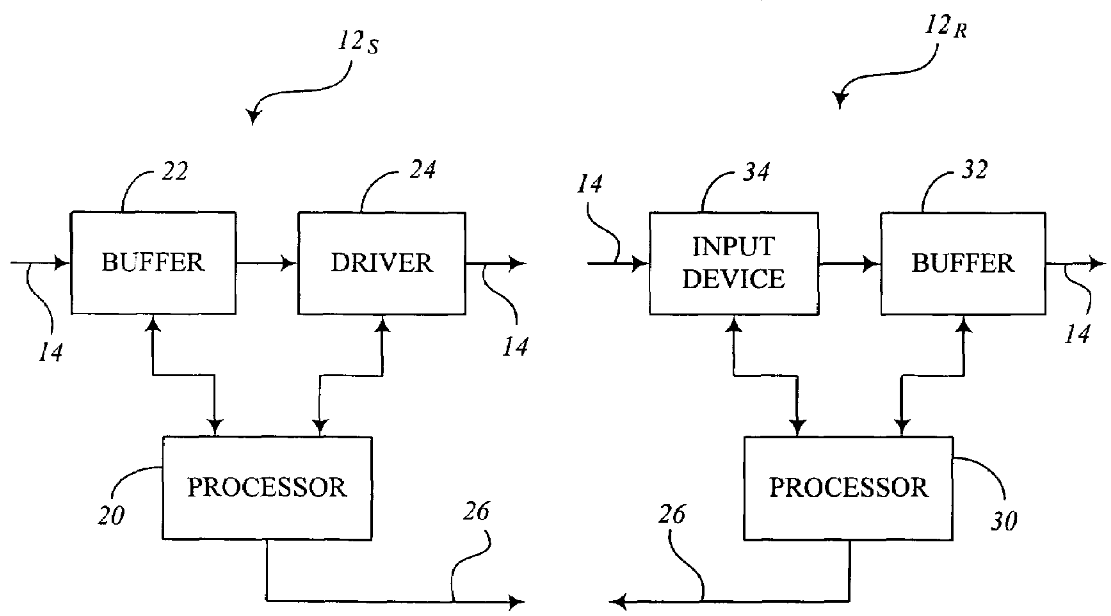
FIG. 2
FIG. 3

| (0, 0) | (0, 1) | (0, 2) | (0, 3) | • • • | (0, C) | XOR ((0, 0) – (0, C)) |
|---|---|---|---|---|---|---|
| (1, 0) | (1, 1) | ~~(1, 2)~~ | (1, 3) | • • • | (1, C) | XOR ((1, 0) – (1, C)) |
| (2, 0) | (2, 1) | (2, 2) | (2, 3) | • • • | (2, C) | XOR ((2, 0) – (2, C)) |
| (3, 0) | (3, 1) | (3, 2) | (3, 3) | • • • | (3, C) | XOR ((3, 0) – (3, C)) |
| ⋮ | ⋮ | ⋮ | ⋮ | ⋱ | ⋮ | |
| (R, 0) | (R, 1) | (R, 2) | (R, 3) | • • • | (R, C) | XOR ((R, 0) – (R, C)) |
| XOR ((0, 0) – (R, 0)) | XOR ((0, 1) – (R, 1)) | XOR ((0, 2) – (R, 2)) | XOR ((0, 3) – (R, 3)) | | XOR ((0, C) – (R, C)) | |

BUFFER FOR STORING DATA AND FORWARD ERROR CORRECTION (FEC)

CROSS-REFERENCE TO RELATED APPLICATIONS

This application is related to the following co-pending U.S. patent applications: Ser. No. 11/482,439, entitled "Determining Strategy for Multicast and/or Unicast Transmission to Correct Forward Errors"; Ser. No. 11/482,438, entitled "Transmitting Additional Forward Error Correction (FEC) Upon Request"; and Ser. No. 11/482,436, entitled "Requesting Additional Forward Error Correction". The related co-pending patent applications listed above are all filed on the same date as, and with the same inventorship as, the present application and are all hereby incorporated by reference in their entirety into the present disclosure.

TECHNICAL FIELD

The present disclosure generally relates to communication systems, and more particularly, the disclosure relates to using forward error correction in a communication system.

BACKGROUND

In many communication systems, packets of data are transmitted over various types of communication channels between various devices. A data packet usually includes a header, data area, and a trailer, wherein the header contains information that directs the packet to the correct receiver or receivers. The header may also include information that can be used to determine a number of packets being transmitted within a data stream. For example, a sequence number may be used for each packet to indicate the sequence of the packet within the stream. Because of any number of problems that may be encountered in a communication system, however, some packets of data do not reach their intended destinations. When the receiver does not receive certain packets or a certain number of packets as indicated in the header or headers, which can be determined from the sequence numbers, for example, the receiver can determine which packets were missed or the number of packets that were missed. As a result of a receiver missing a number of packets and the information not reaching its intended destination, the integrity of the signals and the communication system as a whole is compromised.

One solution for handling the problem of missed packets is to send "forward error correction" (FEC) code corresponding to the data. The FEC code is typically transmitted immediately after the transmission of data and is applied on a different multicast channel. Depending on the amount of FEC code that is transmitted with the data, the receiver can handle a certain number of missed packets. If a device receiving the data and FEC determines that it missed one or more packets, then the device uses the FEC code to attempt to correct the missing packets and fill in the gaps. If the amount of FEC code is not enough to correct all the errors, the receiver corrects as much as possible and forwards the data stream, with some missing packets, to the next device. In this respect, incomplete data can be transmitted through the communication system, which is undesirable. Also, many receivers do not contain enough memory to handle a larger amount of FEC.

Another solution for handling the problem of missed packets is to allow a receiving device to request for a "re-transmission" of the missed packets. In this case, when a receiver realized that it missed one or more packets, it can send a re-transmission request back to the sender. The sender can then transmit a unicast transmission of the missing packets to the receiver. Although this technique may be acceptable when one receiver requests re-transmission, it may experience difficulties when used in a multicast environment. If a sender transmits copies of the data packets to multiple receivers, the sender may also receive numerous re-transmission requests from multiple receivers, especially if there is a widespread problem affecting many transmissions. Too many requests in this situation can overwhelm the sender. Also, it is difficult for a sender to handle such a large number of requests while at the same time maintain state for all the receivers. An edge device transmitting to multiple receivers in a multicast environment may therefore need to contain complex re-transmission circuitry to handle a potentially large number of requests. Thus, a need exists to address these and other deficiencies and inadequacies of the present technologies to provide forward error correction in a more efficient and less complex manner.

BRIEF DESCRIPTION OF THE DRAWINGS

Many aspects of the embodiments disclosed herein can be better understood with reference to the following drawings. Like reference numerals designate corresponding parts throughout the several views.

FIG. 1 is a block diagram of an embodiment of a communication system.

FIG. 2 is a block diagram of an embodiment of the source shown in FIG. 1.

FIG. 3 is a block diagram of an embodiment of the receiver shown in FIG. 1.

DETAILED DESCRIPTION

Figures 4, 5:
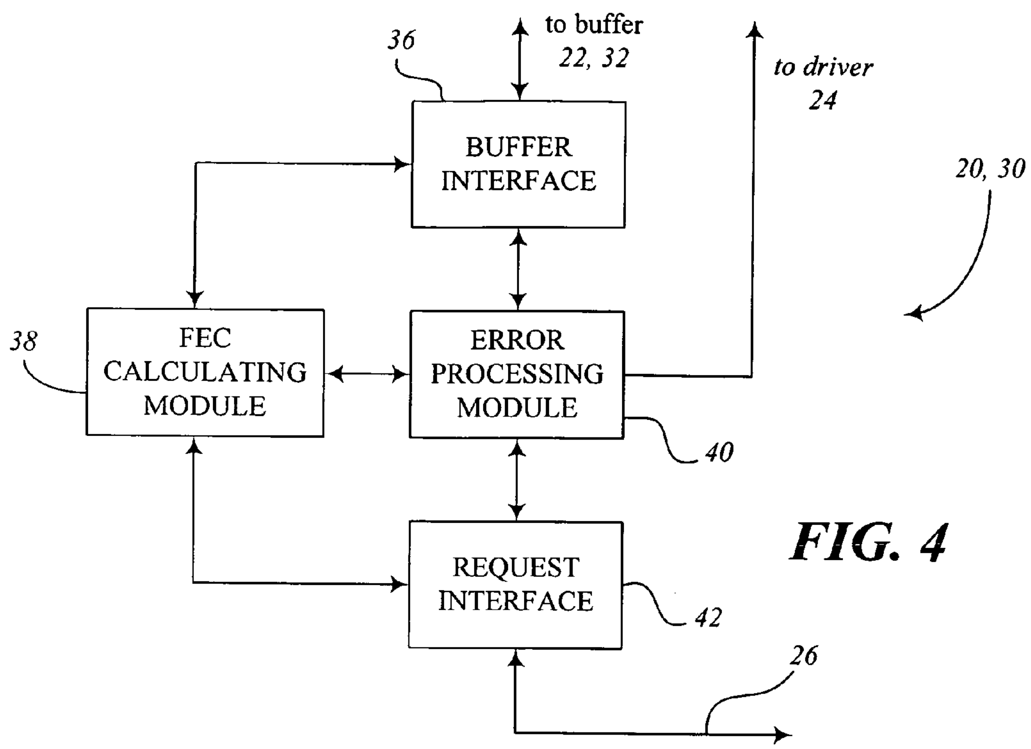
FIG. 4 is a block diagram of an embodiment of either or both of the processors shown in FIG. 2 and FIG. 3.
FIG. 5 is a chart illustrating exemplary forward error correction for an array of data packets.

The present disclosure describes systems and methods for utilizing forward error correction (FEC) in a communication system. The communication system may be any system or network for transferring data, such as, for example, an Internet protocol television (IPTV) network for carrying digital video signals. When one or more data packets do not reach their intended destinations, the communication system attempts to compensate for the missed packets.

A first device of the communication system, referred to herein as a source, sender, transmitter, etc., transmits streams of data packets and may also transmit a certain amount of FEC code. The source transmits to one or more intended recipients, referred to herein as receivers, receiving devices, etc. Data is typically transmitted on one multicast channel while the FEC code is transmitted on a multicast channel different from the transmitted data.

In accordance with the teachings of the present disclosure, when the receiver determines that the FEC code is unable to compensate for missing data packets, the receiver sends a message back to the source including information about the missed packets. The information may include a number of missed packets, a specific identification of the packets that were dropped, or any other suitable message that relays to the source an indication of an error due to dropped or missing packets. In some embodiments, such as a multicast system, for example, the source transmits copies of the data packets to several different receivers. In this case, the source may receive messages concerning dropped packets from many receivers.

In response to receiving the message or messages, the source may perform various functions according to the teachings disclosed in the present application. In some embodiments, the source may send additional FEC to the receiver, or, in the case of a multicast system, to the multicast group of receivers. In conventional systems, a receiver is not able to request additional FEC. However, the present application overcomes this deficiency by allowing the receiver to make such a request if needed. In some embodiments, the source may send redundant data and/or additional FEC in a unicast manner to particular receivers. The source may also determine a strategy for incorporating a combination of multicast and unicast transmission depending on the pattern of error messages from the receivers.

In this way, the source and receivers may more efficiently transmit data packets through the communication system. According to some embodiments, by sending additional FEC only upon request, the communication system can maintain a desirable level of transmitted FEC to correct errors when they occur. By allowing the transmission of additional error correction, the receivers can correct practically any number of missed packets. The communication system may initially transmit a minimum level of FEC code and then add more FEC to the FEC multicast when needed. In this way, the receivers can receive a sufficient amount of FEC to correct detected errors.

I. System

FIG. 1 is a block diagram of an embodiment of a communication system 10. In this embodiment, the communication system 10 includes a number of communication devices 12 arranged in a multicast configuration. In a multicast scheme, certain communication devices 12 can create copies of the data for transmission to the respective receivers and transmit the data to a group of destinations simultaneously over multiple communication links 14.

For the purpose of illustration, one communication device in FIG. 1 is labeled "source" $\mathbf{12}_S$ and another communication device is labeled "receiver" $\mathbf{12}_R$. The source $\mathbf{12}_S$ may be any component in the communication system 10 that transmits data downstream to another device. The source $\mathbf{12}_S$ may be, among others, an edge device, multiplexer, encoder, etc. The source $\mathbf{12}_S$ may be located in a head-end, central office, or other location, and/or may receive data from other sources. The receiver $\mathbf{12}_R$ may be any component in the communication system 10 that receives data from an upstream device. The terms "upstream" and "downstream" are used herein to refer to transfer of signals in one particular direction and are merely used for illustrative purposes. However, it should be recognized that data transfer may be directed in the opposite direction such that a downstream device transmits data to an upstream device. The receiver $\mathbf{12}_R$ may be, among others, an end device, such as a computer, set-top box, modem, etc. The receiver $\mathbf{12}_R$ may be located in a customer premises, such as a home, office, school, etc., and/or may distribute data to other downstream receivers.

The communication link 14 between the source $\mathbf{12}_S$ and receiver $\mathbf{12}_R$ can be any suitable transmission path or channel and may contain transmission lines, wireless channels, fiber optic, or combinations of these or other types of communication links. Also, other communication devices 12 may be communicatively interposed between the source $\mathbf{12}_S$ and receiver $\mathbf{12}_R$. In addition, the source and receiver may be located anywhere in the communication system 10 and separated by any distance.

Typically, data is transmitted to a group of receivers in a first multicast group. Initially, the minimum amount of FEC code transmitted with the data is sent in a second multicast group. Normally, the receivers configured to tune to the first multicast group are also configured to tune to the second multicast group to receive both data and the minimum amount of FEC code. Additional FEC code, transmitted upon a request or requests from the receivers, is sent, in most embodiments, on the second multicast channel. In this respect, the volume of FEC on the second multicast channel is increased to supply the additional FEC code to the receivers. However, in some embodiments, the additional FEC may be transmitted on a third multicast channel. Some or all of the receivers may be configured to tune to the third multicast channel in order to receive the additional FEC as needed. The particular use of multicast channels may be dependent upon the last-mile technology of the communication system 10.

In the present disclosure, the source $\mathbf{12}_S$ and receiver $\mathbf{12}_R$, and portions thereof, can be implemented in hardware, software, firmware, or a combination thereof. If the source $\mathbf{12}_S$ and receiver $\mathbf{12}_R$ contain software or firmware for performing the disclosed functions, the software or firmware may be stored in a memory and executed by a suitable instruction execution system. If implemented in hardware, the source $\mathbf{12}_S$ and receiver $\mathbf{12}_R$ can be implemented, for example, with discrete logic circuitry, an application specific integrated circuit (ASIC), a programmable gate array (PGA), a field programmable gate array (FPGA), or any suitable combinations of logic components.

A. Source

FIG. 2 is a block diagram of an embodiment, illustrated in a simplified form, of the source $\mathbf{12}_S$ shown in FIG. 1. The source $\mathbf{12}_S$ may be configured to operate in conjunction with the receiver $\mathbf{12}_R$ as described below with respect to FIG. 3 or with any suitable receiver having corresponding circuitry and/or functionality for receiving data and forward error correction (FEC) code transmitted in stages as described herein. The source $\mathbf{12}_S$ may be a multiplexer, digital subscriber line access multiplexer (DSLAM), decoder, router, digital contact manager (DCM), video acceleration module (VAM), edge device, or other communication device that transfers data to another location or component. As an example, the source $\mathbf{12}_S$ may be located at a head-end facility, central office, node, or at other locations in the communication system 10.

In this embodiment, the source $\mathbf{12}_S$ includes, among other things, a processor 20, a buffer 22, and a driver 24. Normally, the buffer 22 receives streams of data packets from another source or group of sources. The buffer 22 comprises a number of addressable registers (not shown), each register typically configured to temporarily store a single packet from a stream of data packets. The driver 24 may include any suitable component or combination of components for outputting, driving, or transmitting signals to one or more destination devices. The driver 24 may be configured to communicate with one receiver, or, in the case of a multicast system, to multiple receivers.

The processor 20 is configured to access the packets from the buffer 22 and calculate FEC code. The processor 20 calculates N "portions" of FEC code (where N can be any number), depending on several factors as explained in more detail below. In this disclosure, a first portion of FEC code, designed to overcome one missed data packet, is referred to as "F1". A second portion of FEC code, designed to overcome two missed data packets when used in conjunction with F1, is referred to as "F2". Portions F1-F3 are designed to overcome three missed packets, and so on. The processor 20 calculates N portions of FEC code such that the sum of F1 through FN is capable of handling N missed packets. It should be understood, however, that any suitable algorithms for creating FEC may be used. Also, other algorithms may result in FEC code that requires two or more "portions" to overcome each error.

The processor 20 stores the calculated portions of FEC code (F1 through FN) in additional registers in the buffer 22. The processor instructs the driver 24 to transmit the data packets and FEC from the buffer 22 along the communication link 14 to the receiver $\mathbf{12}_R$ or receivers. Typically, the driver 24 is configured to transmit the FEC immediately before the data, simultaneously with the data, or immediately after the data, on a different multicast channel. In some embodiments, however, the FEC may be interleaved with the data or appended to the data and transmitted on the same multicast channel. However, other transmission techniques may be used as well. Also, the relationship between the time of transmission of the data and the time of transmission of the FEC may be variable and may depend on certain factors as described herein. The amount of FEC that is initially transmitted with the data may be predetermined. For instance, the processor 20 may instruct the driver 24 to output only a minimum amount of FEC code, such as only F1, for example, or even no FEC at all, with the data. In this respect, the remaining FEC code that is not sent with the data is stored in the buffer 22 until needed, if needed at all.

The receiver $\mathbf{12}_R$ receives the data packets and FEC and determines whether or not the initial FEC transmitted with the data is sufficient to correct any detected errors. If so, then the additional FEC in the buffer 22 of source $\mathbf{12}_S$ is not needed, and the processor 20 may delete the unneeded FEC in the buffer 22 or simply allow the registers storing the unneeded FEC code to be overwritten. However, if the receiver $\mathbf{12}_R$ determines that the original FEC is not sufficient to correct all the errors, then the receiver $\mathbf{12}_R$ may send an error indication to the source $\mathbf{12}_S$, wherein the error indication may be interpreted as a request for additional FEC from the source $\mathbf{12}_S$. Requests from the receiver $\mathbf{12}_R$ are received by the source $\mathbf{12}_S$ via communication link 26. Communication link 26 may be a dedicated transmission path separate from the communication link 14 or may be associated with the communication link 14.

Upon receiving error indication messages from one or more receivers, the source $\mathbf{12}_S$ performs an analysis of the messages. By analyzing multiple requests, the processor 20 can determine a strategy for transmitting additional FEC portions and/or one or more unicasts of data re-transmissions to a number of specific receivers. For example, the additional FEC portions may be sent in the multicast. The FEC portions may include F2-FX, for example, where F1 is initially transmitted with the data and FX is an Xth FEC code portion of the FN portions where X−1 is the number of additional FEC portions. After analyzing the requests and determining a strategy for correcting errors, the processor 20 instructs the driver 24 to transmit additional FEC and/or data to the receivers. In this example, the processor 20 instructs the driver 24 to transmit F2-FX to a first group of receivers, which may include the receivers in a multicast group in communication with the source $\mathbf{12}_S$, and to transmit particular data packets to a second group of receivers in one or more unicasts. The first group and second group of receivers may include sets having an overlapping group of receivers or completely distinct sets, depending on the application.

Analysis of the error indications may lead the source $\mathbf{12}_S$ to select from a number of previously created FEC portions to determine one or more portions that are capable of correcting forward errors. Also, a first set of FEC portions may be selected for one group of receivers to correct certain errors and a second set of FEC portions may be selected for another group of receivers to correct other errors. The selected FEC portions may be transmitted to the receivers in a multicast or in one or more unicasts, as needed. The possible strategies for analyzing error indications and determining various strategies for transmitting pre-calculated, selected, or customized FEC and/or redundant data in multicast and/or unicast transmission is virtually endless. Regardless of the strategies developed for sufficient error correction, the source $\mathbf{12}_S$ is capable of changing the depth (as defined by N) of the FEC, substantially in real-time, to provide additional error correction on demand. This capability is not achieved in conventional communication devices.

B. Receiver

FIG. 3 is a block diagram of an embodiment, illustrated in a simplified form, of the receiver $\mathbf{12}_R$ shown in FIG. 1. In some embodiments, for example, the receiver $\mathbf{12}_R$ may operate in conjunction with the source $\mathbf{12}_S$ shown in FIG. 2 or with another respective source having related functionality for transmitting data and FEC in stages. The receiver $\mathbf{12}_R$ may be configured as or incorporated within, among other devices, a set-top box, computer, modem, VAM, etc. In this embodiment, the receiver $\mathbf{12}_R$ includes, among other things, a processor 30, a buffer 32, and an input device 34. The input device 34 receives the incoming data packets and FEC and stores it in the buffer 32, which may include registers (not shown). Initially, data is transmitted with a predetermined amount of FEC. This predetermined amount may include, for example, no FEC portions, one FEC portion, a minimum number of FEC portions, or any desirable number of FEC portions, depending on the application. The buffer 32 is typically capable of storing a limited amount of FEC.

The processor 30 accesses the data and FEC from the buffer 32 to determine the condition of the received data. By analyzing the header, or particularly the sequence numbers in the headers of the data packets, to determine the packets that were transmitted, the processor 30 can determine if any packets were not received. For example, the processor 30 can determine either the number of packets that were missed or the specific packets that were missed. The receiver $\mathbf{12}_R$ determines how many packets it can afford to lose and still be within the ability of the FEC to correct the errors. If the initially received FEC is sufficient to recover the missed packet or packets, then the transmission is considered a success. In this case, the data is corrected, if necessary, and transmitted to the next component, if any, in the communication system 10.

If the initially received FEC is not sufficient to recover all missed packets, then the receiver $\mathbf{12}_R$ may send a message to the source $\mathbf{12}_S$ indicating that errors exist in the received packets. Essentially, the message may be considered a request for more FEC code to recover the missing packets. Alternatively, the receiver $\mathbf{12}_R$ may send the error message to a transmitting device other than the source $\mathbf{12}_S$ from which data packets are received. In this respect, the receiver $\mathbf{12}_R$ can join a multicast group that is not directly related to the source of data packets. In other embodiments, the receiver $\mathbf{12}_R$ can download additional FEC code using a file transfer protocol (FTP) type of data exchange. In this case, the receiver $\mathbf{12}_R$ may download from an FTP server not directly related to the source of data packets. Other methods for receiving additional FEC may become apparent to one having ordinary skill in the art in light of the present application. However, to simplify the discussion herein, the error messages or FEC requests are described as being sent to the source $12_S$.

The receiver $12_R$ may be designed such that it does not have the intelligence to know whether it might expect to receive a data unicast or additional FEC from the source $12_s$, in response to the request. Instead, the receiver $12_R$ simply indicates the presence of errors regarding the particular missing packets or number of packets. The processor 30 informs the source $12_S$ of the need for more FEC by sending an indication message or request along communication link 26. The processor 30 may indicate the number of FEC portions that are needed or indicate which specific packets are missing. When the error message is communicated to the source $12_S$, the receiver $12_R$ can join a particular multicast group to receive any data or FEC that is transmitted on the multicast channel to fill the gaps in the data stream. In response to the message, the source $12_S$ transmits the missing data or more FEC code to the receiver $12_R$, according to the particular embodiments. The input device 34 stores this data or additional FEC in the buffer 32 and the processor 30 can recover or restore the missing packets. When the data packets have been restored, the processor 30 sends the data to the next communication device 12.

In some embodiments, the processor 30 in the receiver $12_R$ may be configured to calculate new FEC code for the received data and repeat the process that the source $12_S$ executed to send data to the receiver. In fact, the communication system 10 may include a number of communication devices 12 that act as both the source and receiver, as defined according to the teachings herein, to provide additional FEC upon request as data packets are transmitted through the system. As an alternative to the processor 30 calculating new FEC code, the FEC code received from a previous source and stored in the buffer 32 may be used during the next transmission to the next receiver.

C. Processor

FIG. 4 is a block diagram of an embodiment of the processor 20 of the source $12_S$ and/or the processor 30 of the receiver $12_R$. As described in this embodiment, the processor 20, 30 may include all or some of the components shown in FIG. 4. If omitted from this embodiment, the corresponding components may be located in the other respective source or receiver processor for accomplishing the various functions described herein. In addition, the corresponding source and receivers may have duplicate components, such that each of the source and receiver can accomplish the various functions as needed. Certain components may be placed in the source and others placed in the receiver, depending on the particular design. Other alternatives and/or modifications to the circuitry will be understood by one of ordinary skill in the art as being within the scope of the present disclosure.

The embodiment of the processor of FIG. 4 may include, among other things, a buffer interface 36, an FEC calculating module 38, an error processing module 40, and a request interface 42. The buffer interface 36 is in communication with the buffer 22, 32 for accessing data packets and FEC code stored in the registers. The request interface 42 is in communication with the communication link 26, which is used for transferring requests from the receiver to the source.

The FEC calculating module 38 may include any suitable combination of hardware and/or software to achieve the functions described below. The FEC calculating module 38 may be configured together with the error processing module 40 or other hardware and/or software into one unit or can be divided into multiple units. In general, the FEC calculating module 38 receives the data packets from the buffer via the buffer interface 36 and calculates FEC code for correcting errors that may occur during transmission between the transmitter and receiver.

The FEC calculating module 38 may utilize any algorithm or combination of algorithms suitable for encoding FEC capable of overcoming missed packets. As an example, by creating FEC code similar to Raptor codes, the calculated FEC code may include FEC portions F1, F2, . . . FX, wherein each FEC portion is capable of overcoming one missed packet. The FEC calculating module 38 may create FEC as deeply as needed. If the need for FEC changes over time, the FEC calculating module 38 may be adjusted accordingly. In some embodiments, the FEC calculating module 38, instead of calculating new FEC code, may be configured to confirm the validity of FEC code already received from a previous source, in order to reduce the redundancy of calculating the same FEC code. In addition, a combination of calculated or validated FEC code may be used. After the FEC calculating module 38 creates or gathers the FEC code to be transmitted with respect to the corresponding data packets, the FEC calculating module 38 stores the FEC code in the buffer 22, 32 via the buffer interface 36. In some embodiments, the buffer 22, 32 in which FEC code is stored may be separate from memory from which the processor 20, 30 accesses to compute FEC code.

The error processing module 40, which may be configured in hardware and/or software, determines the condition of a received data stream. In some embodiments, particularly with respect to the receiver $12_R$, the error processing module 40 may access the received data stream stored in the buffer 22, 32 via the buffer interface 36 and analyze the header of the data packets to determine the identity or number of packets transmitted in the data stream. From this analysis, the error processing module 40 compares the data packets that were successfully received with the indication of the packets that were transmitted. If there is an inconsistency in this respect, then an error is detected and the error processing module 40 may attempt to correct the error using any FEC transmitted with the data.

If the FEC is sufficient to correct the error or errors, the error processing module 40 corrects the errors, if any. In some embodiments, the error processing module 40 may also indicate that the data is acceptable by sending a message to the source $12_S$ that any or all errors have been corrected and no additional FEC is needed. At this point, the error processing module 40 may instruct the FEC calculating module 38 to calculate FEC code, as described above, and may instruct the driver 24 to output the data to the next receiver in order to advance the data through the communication system 10.

In some embodiments, the error processing module 40, particularly with respect to the source $12_S$, may receive a message or messages from downstream receiver(s) via the request interface 42, indicating the condition of data streams received downstream. In this regard, the error processing module 40 may remotely analyze the condition of the data stream and determine a strategy for transmitting data and/or FEC code to the receivers as needed. These strategies are described in more detail below. In addition, the error processing module 40 instructs the driver 24 how to handle the data and FEC for downstream transfer. The instructions to the driver 24 may include particular multicast groups and unicast groups, what data and FEC is to be transmitted, how it is to be transmitted, etc.

The FEC calculating module 38 and error processing module 40 of the processor 20, 30 may comprise an ordered listing of executable instructions for implementing logical functions as discussed above. The instructions and programs for executing these functions can be embodied in any computer-readable medium for use in or by an instruction execution system, apparatus, or device. In the context of this document, a "computer-readable medium" can be any medium that can contain, store, communicate, propagate, or transport the program for use by the instruction execution system, apparatus, or device. The scope of the present disclosure is intended to include the functionality of the disclosed embodiments configured with logic in hardware and/or software mediums.

II. System Operation

In this section, the functional operations of the communication system 10 will be described. Although particular references may be made to the physical elements illustrated in FIGS. 1-4, it should be understood that the following processes, steps, functions, or operations may be performed by any suitable components as will be evident by one of reasonable skill in the art.

In particular, the source $\mathbf{12}_S$ receives or acquires data in any suitable manner and processes the data to determine FEC code. The FEC code may be in any suitable form, created using any suitable encoding algorithm or combination of algorithms, such as Pro-MPEG, Raptor, or others. For example, the data packets may be laid out in an array having R rows and C columns, as depicted in FIG. 5. In a simple PRO-MPEG algorithm, for example, the FEC may be calculated by determining an exclusive-OR (XOR) of the packets in each row to achieve a number R of row XORs and an XOR of the packets in each column to achieve a number C of column XORs. In this example, the total number of FEC portions is R+C, which is sufficient, in some scenarios, to handle up to R+C missed packets, which is an extremely deep FEC. If packet (1, 2) were dropped, for example, the dropped packet can be restored using packets (1, 0), (1, 1), (1, 3) through (1, C), and XOR ((1, 0)-(1, C)). Instead of using the row XOR and other packets of the row, packet (1, 2) can also be restored using the packets of the same column and the column XOR.

Instead of transmitting all R+C FEC portions, one strategy may be to initially transmit only the row FEC and send the column FEC upon request, or vice versa. Another strategy may be to preemptively create several FEC portions based on different combination or blocks of an array. For example, assuming a particular data stream can be arranged in a 10×10 array, the FEC calculating module 38 may determine an FEC of the entire array in addition to sub-sets of the array, such as a 2×5 sub-set, 3×5 sub-set, 5×10 sub-set, etc. When additional FEC is needed, one or more of the various sub-sets may be selected for transmission to the receivers, based on a known capability of the particular sub-sets to correct certain errors. This strategy may be used, for example, with error correction algorithms such as PRO-MPEG.

With other types of error correction algorithms, such Raptor codes or fountain codes, each FEC portion is essentially capable of correcting one error, or restoring one missed packet. In this case, the error processing module 40 simply instructs the driver to transmit a certain number of FEC portions, e.g. F2-FX. No selection of portions is necessary in this scheme. These types of FEC algorithms may operate using a Boolean operation, for example, over the whole packet, such that one FEC portion handles one lost packet, etc. To simplify the discussion regarding various possible FEC algorithms, the example of these types of FEC portions that correct one error each will be in the remaining examples in the present application.

Figure 6:
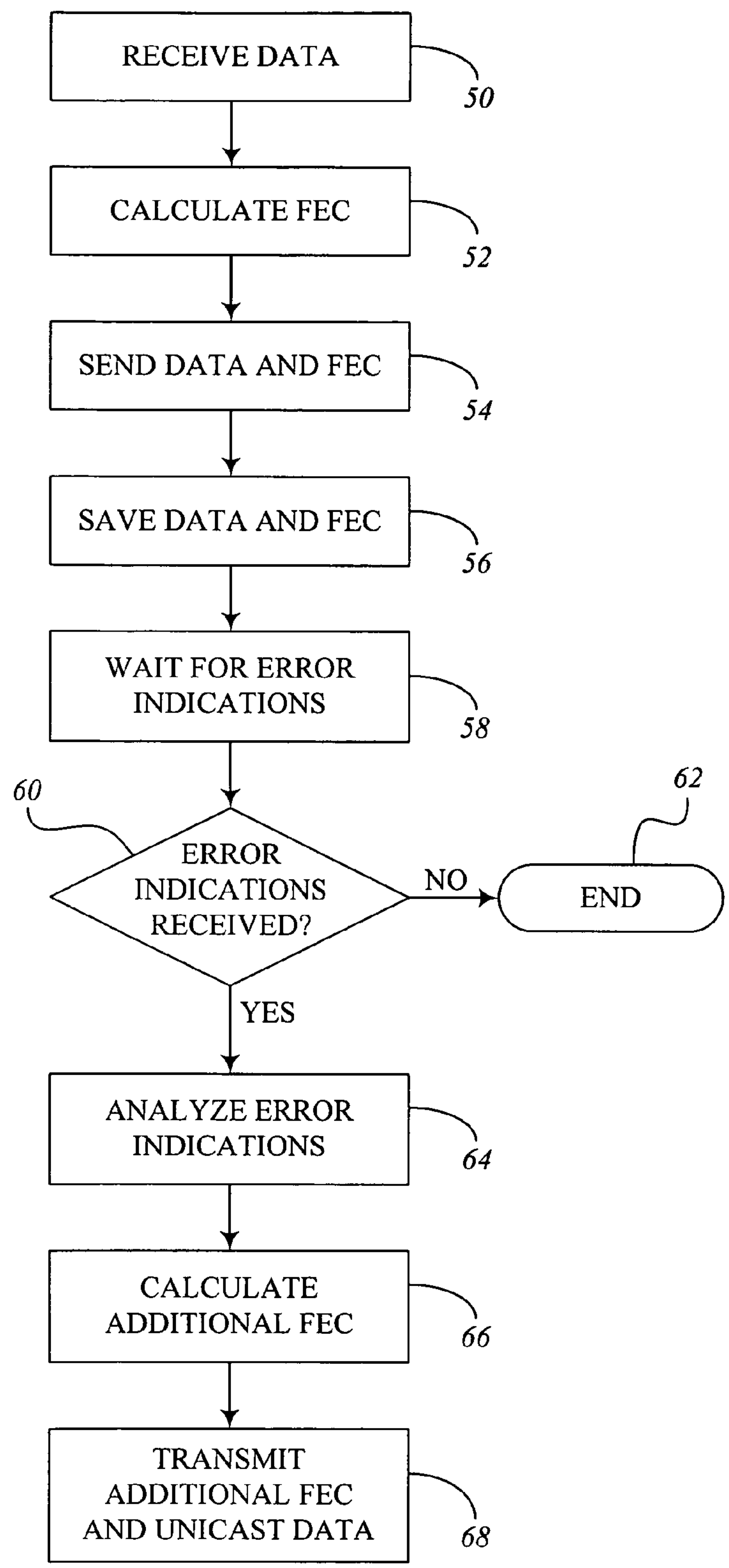
FIG. 6 is a flow chart illustrating an embodiment of a process performed by a source device in a communication system.
Figure 7:
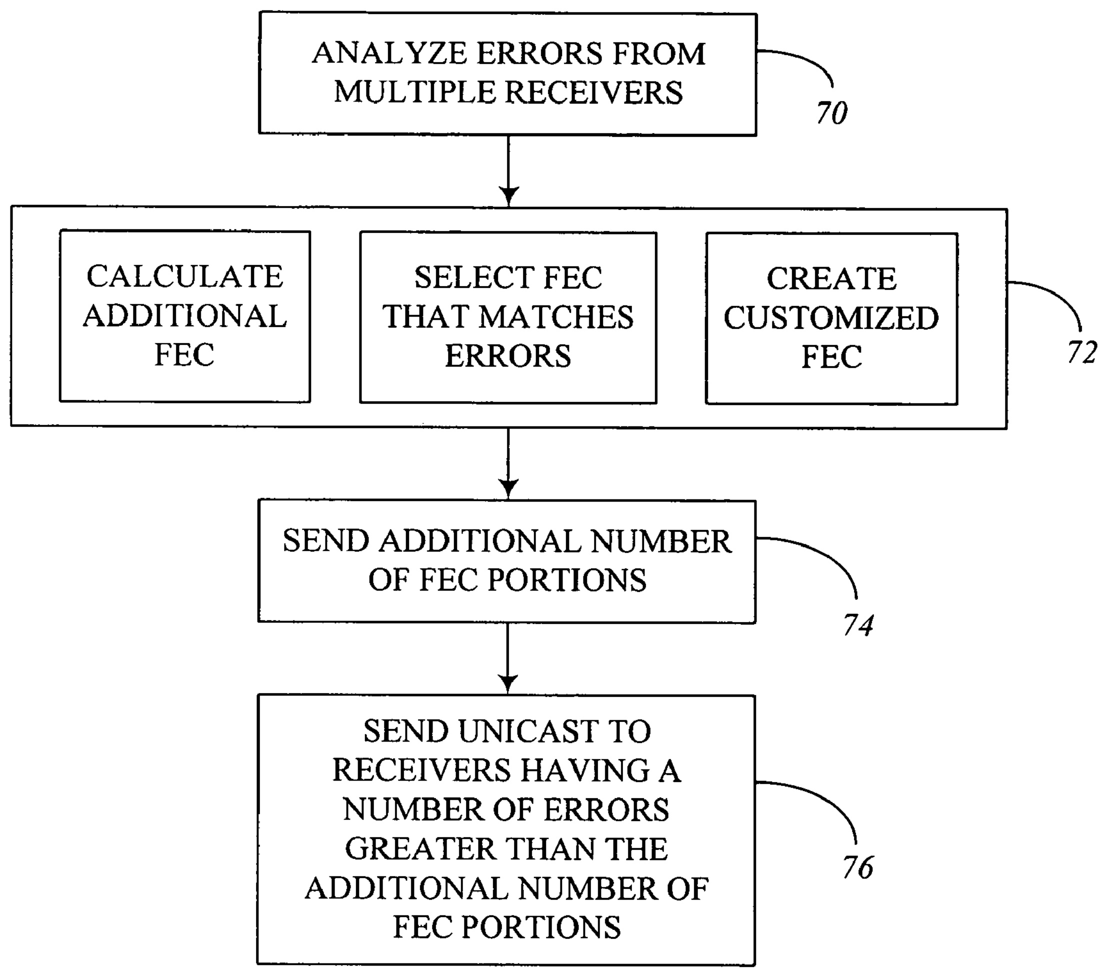
FIG. 7 is a flow chart illustrating an embodiment of a process for determining a strategy for multicast and/or unicast transmission in response to error indications.
Figure 8:
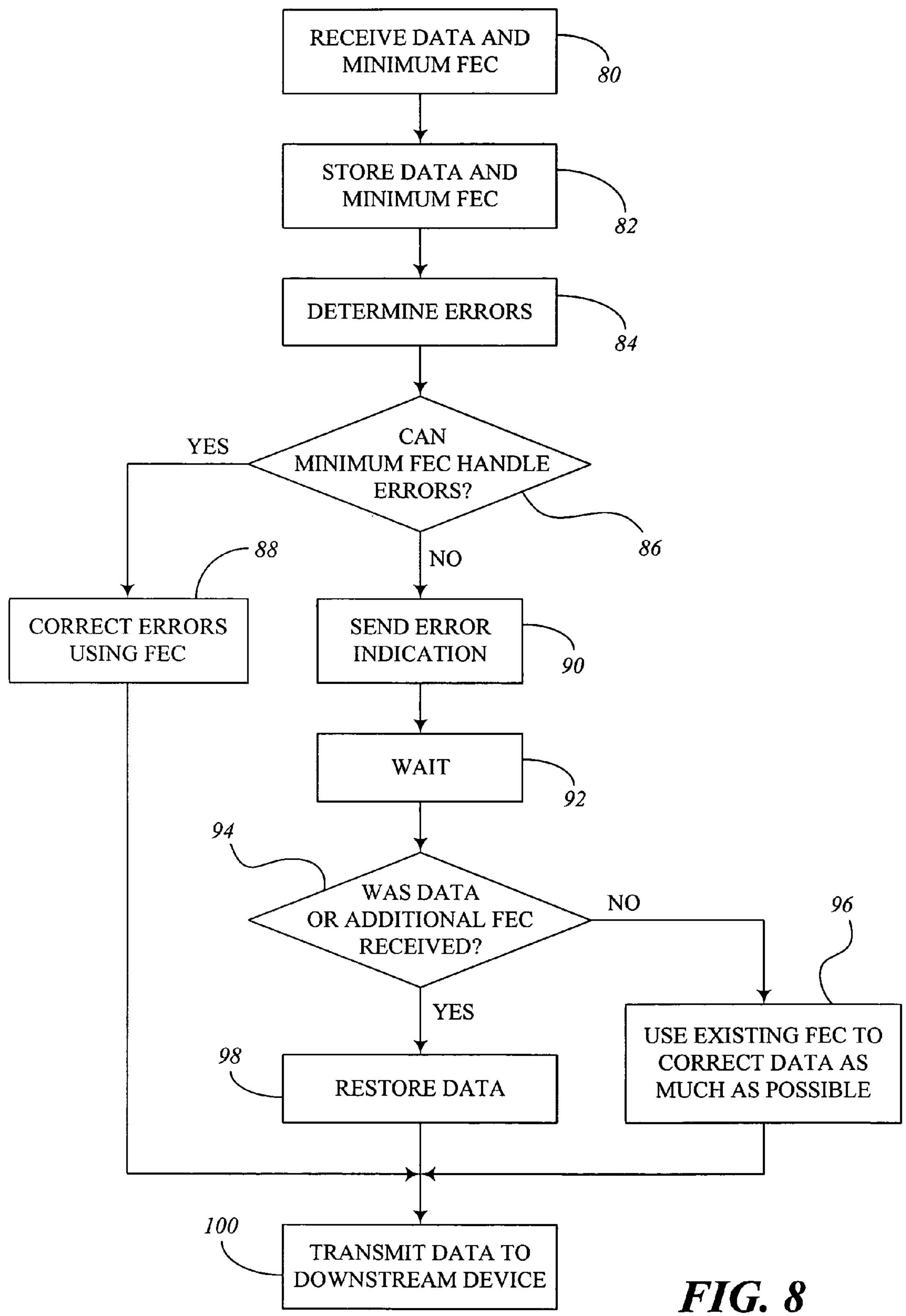
FIG. 8 is a flow chart illustrating an embodiment of a process performed by a receiver device in a communication system.

The flow charts illustrated in FIGS. 6-8 show the architecture, functionality, and operation of possible implementations of the communication system. In this regard, each block may represent a module, segment, or portion of code, which may be configured in software. Each block comprises one or more executable instructions for implementing the specified logical function(s). It should also be noted that in some alternative embodiments, the functions noted in the blocks may occur out of the order shown or described or may not occur at all. In addition, two or more blocks may be executed substantially concurrently, depending upon the functionality involved. Alternative embodiments are considered to be included within the scope of the present disclosure as would be understood by those reasonably skilled in the art.

A. Source Operation

FIG. 6 is a flow chart of an exemplary process executed, for example, by a source device configured to transmit additional FEC upon request. The flow chart includes receiving a data stream, as indicated in block 50. The data can be received, for example, from an upstream communication device or source. In block 52, FEC is calculated or encoded for enabling a downstream device to correct the data if necessary. The encoding of FEC may include encoding a maximum amount of FEC to handle a maximum number of missed packets. In other embodiments, this block (block 52) may be omitted if no initial FEC code is transmitted with the data. Also, in some embodiments, a minimum amount of FEC may be calculated, and, in this regard, additional FEC may be encoded at a later time, such as after transmission of the data and initial FEC or after receiving error indications, as discussed below.

In block 54, the flow chart includes transmitting the data and a minimum amount of FEC to a downstream receiver. The minimum amount of FEC may be a predetermined amount or may be varied based on changing characteristics or conditions of the communication system. As an example, the minimum amount may be enough FEC code to overcome one missed packet. If the communication system determines that the minimum amount of FEC is not enough or is too much, the minimum amount may be modified.

In block 56, the data and FEC calculated in block 52 is temporarily stored in memory or another storage device. The data and FEC is stored for a predetermined time based on an amount of time for the data to propagate to the receiver, for the entire data stream to be read into the buffer of the receivers, and for possible return signals indicating a request for more FEC. The wait time is equal to at least the round trip time for a signal to travel from the source to the receiver and back. Also, the wait time includes any time for receiving the entire stream of data and the processing time for analyzing the condition of the packets. After this time expires and no requests have been made, the stored data and FEC are no longer needed since the transmission in this case is determined to be a success. If requests are made for more FEC, then the saved data and FEC can be used, as indicated below. The flow chart further includes waiting for any error indication from a single receiver, or from multiple receivers in regard to a multicast system, as depicted in block 58.

In decision block 60, it is determined whether or not error indications were received within the wait time. If not, then no further action is needed and the process (for this respective data stream) ends, as indicated in block 62. At the end of the process, the flow chart may be repeated for another subsequent data stream and this may be cycled indefinitely. Also, at the end of the process, other steps may be taken to delete the data and FEC stored in memory or other actions to initialize for the next data stream. If it is determined in block 60 that error indications were received, then the flow proceeds to block 64.

In block 64, the error indications are analyzed to determine, for example, which receivers missed packets, how many packets each receiver missed, which packets were missed, etc. Based on the analysis, additional FEC is encoded, if necessary, according to block 66. If block 52 includes calculating a maximum amount of FEC, such that additional FEC does not need to be calculated, then block 66 may be omitted. If, for instance, only F1 is calculated in block 52 and transmitted in block 54, then calculating additional FEC in block 66 includes calculating F2-FX, where FX is the total amount of FEC needed for overcoming the missed packets. Based on the analysis of block 64, calculating additional FEC in block 66 may, in some embodiments, include creating customized FEC code. In this respect, if the error indications convey a pattern that can be optimally represented by customized FEC, specific code can be created.

Based on the analysis of block 64 and the additional FEC code, calculated in block 52 or block 66, the flow chart further includes block 68, in which additional FEC and/or specific data is transmitted to respective receivers according to a multicast/unicast strategy. If customized FEC is created, an indication of the characteristics of the customized FEC or what it represents can also be transmitted in order to inform the receiver(s) how to handle the customized FEC. Transmitting FEC may also include selecting particular FEC code based on the analysis of block 64 to determine a match that optimally overcomes the errors. Blocks 64, 66, and 68, in some embodiments, may include the process described below with respect to FIG. 7.

Some of the processes and blocks described with respect to FIG. 6 may actually represent functions that can be handled by the receiver. Also, some blocks may be repeated by both the source and receiver or divided between the two in any suitable manner to achieve the goal of transmitting additional FEC code as described herein.

FIG. 7 is a flow chart illustrating an embodiment of a process for determining a multicast/unicast strategy when error indications are received from multiple receivers. In block 70, the flow chart includes analyzing errors from a number of receivers. The errors, or error indications, received from the receivers may represent specific packets that each receiver missed, a number of errors that each receiver encountered, or both. Analyzing the errors in block 70 may include statistical analysis to determine an optimal plan for correcting the errors. The plan may include any suitable combination of multicasts and/or unicasts. In some embodiments, it is determined to transmit additional FEC on a particular multicast channel and specific data on a unicast channel.

Block 72 includes various processes involved to create or gather additional FEC to be transmitted. In one embodiment, additional FEC is calculated in a manner to provide a number N of FEC portions to correct N errors. This block may also include an embodiment where particular FEC code, such as code pre-calculated at an earlier time, is selected or matched based on its ability to correct certain data packets. Another embodiment of block 72 includes creating a customized FEC based on the analysis of block 70 to provide an FEC that sufficiently handles a certain data packet error or combination of data packet errors.

In block 74, an additional number of FEC portions are transmitted. As an example, if 95% of the receivers reported that they missed between zero and four packets, then block 74 may include sending four additional FEC portions, e.g. F2-F5, given that F1 was originally transmitted with the data. In this way, the majority of the receivers receive a multicast of the four additional FEC portions and can overcome the missed packets. In some embodiments, block 74 may include sending a number of FEC portions proportional to the requests from the most needy receiver requesting the highest number of FEC portions. In this case, the FEC covers all errors.

The additional FEC portions multicasted to the receivers can have a predetermined maximum number of FEC portions. Another strategy may include determining the number of FEC portions to be transmitted based on the most frequently reported number to errors or missing packets. In this case, receivers having more than the number of errors may receive a unicast as mentioned below. Other algorithms using various statistical analysis methods may be utilized to determine a plan to send a multicast of predetermined or customized FEC portions.

In block 76, the process includes sending unicast messages to the receivers having a number of indicated errors greater than the number of FEC portions transmitted in block 74. In the above example, if the remaining 5% of the receivers indicated having various numbers of errors greater than four, then a unicast can be sent to these receivers. This process may include establishing a tier system where only certain receivers are sent unicasts. For example, if one or more receivers indicate an unusually high number of errors, block 76 may simply ignore these requests since too many resources would be needed to transmit to these faulty devices.

According to some embodiments, blocks 74 and 76 may be combined to include a hybrid approach in which certain thresholds are established to determine which group of receivers is placed in a first multicast group, which group of receivers is placed in a second unicast group, and which group of receivers do not receive any transmission. This last group may be faulty components that indicate a number of errors above the highest threshold. In this case, the last group may simply be ignored.

B. Receiver Operation

FIG. 8 is a flow chart illustrating an embodiment of a process carried out, for instance, by a receiver in a communication system. In this embodiment, block 80 includes receiving data and a minimum amount of FEC code from a source. As mentioned above, the minimum amount of FEC code may include no FEC, enough code to overcome one missed packet, or any other suitable amount. In block 82, the data and minimum amount of FEC is stored in memory, or another storage location. In some embodiments, the process may include storing the data and FEC for a predetermined time period, such as the time for a signal to travel a round trip from the receiver to the source and back to the receiver again, plus any processing time necessary for handling the request. If error indications are reported back to the source and the source determines that the particular receiver does not receive any additional FEC or any unicast information, such as when the error indication is too excessive to be handled, then the receiver may delay the wait time and then realize that the request has been ignored. In this case, the process might include attempting to correct the present data as best as possible and transmitting the data down the system.

In block 84, the errors regarding missed packets are determined. This process may include determining the number of missed packets or determining the specific packets that were missed. With respect to simply determining a number of missed packets, the receiver can receive additional FEC portions but is typically not able to receive a unicast of specific packets. If specific packets are determined and this determination is communicated to the source, then the receiver may receive either a number of FEC portions or specific packets in a unicast or both.

In decision block 86, it is determined whether or not the detected errors can be handled by the minimum FEC received in block 80. If so, the errors are corrected using the existing FEC, as indicated in block 88, and flow proceeds to block 100. If it is determined in block 86 that the FEC is not sufficient to handle the errors, then flow proceeds to block 90. In block 90, an indication of the errors is transmitted back to the source. This error indication is essentially a request for more FEC or data to help patch the missing packets. The error indication can be a number representing the number of missed packets, the specific packets missed, or both.

In block 92, the process includes waiting for a predetermined time based on the round trip time mentioned above. The wait time may be a factor of the distance between the source and receiver or the distance between the source and another receiver of the corresponding multicast group that may be located the farthest distance from the source. The wait time also takes into account processing time and other factors and may include extra time for inevitable unknown delays.

After or during the wait time, the receiver may receive additional FEC portions or data, as indicated in decision block 94. If no data or additional FEC is received, the process flows to block 96, where the existing FEC is used to attempt to correct as many errors as possible. After block 96, flow proceeds to block 100. If it is determined in decision block 96 that data and/or additional FEC code was received, then flow proceeds to block 98 where the data is corrected or restored to its original pre-transmitted form. This block may also include decoding a customized FEC if the source created one. Also, the data is restored by retrieving the data and FEC stored according to block 82 and utilizing this data and FEC along with the newly acquired data and FEC.

At this point, the flow proceeds to block 100, where the restored or partially corrected data is transmitted downstream through the communication system. The data at this point may be error-free data from block 88, faulty or partially restored data from block 96, and/or restored data from block 98. In addition, sending data to the next stage may include repeating the steps of the source with respect to FIGS. 6-7, if the receiver includes the functionality of the source. Some of these functions of the receiver may actually be handled by the source, and vice versa.

Conditional language, such as "can," "could," "might," or "may," among others, is generally intended to convey, unless specifically stated otherwise, or otherwise understood within the context, that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A communication device in a communication system, the communication device comprising:

a buffer configured to store a stream of data packets and forward error correction (FEC) code associated with the stream of data packets; and a processor configured to control the transmission of the stream of data packets and FEC code to a receiver device located downstream on the communication system;

wherein the processor is further configured to wait a predetermined period of time, after transmitting the stream of data packets and a portion of the FEC code, to determine whether or not the receiver device requests for additional FEC code wherein when the processor does not receive a request from the receiver device after the predetermined period of time, the processor determines that the receiver device does not require additional FEC code.

2. The communication device of claim 1, wherein the predetermined period of time is related to a round-trip time for a signal to propagate between the communication device and the receiver device.

3. The communication device of claim 2, wherein the predetermined period of time is further related to an amount of time for the receiver device to receive the entire stream of data packets and determine whether or not there is an error therein.

4. The communication device of claim 1, wherein, upon receiving a request for additional FEC code, the processor transmits a certain amount of additional FEC code to the receiver device.

5. The communication device of claim 4, wherein the processor is further configured to determine the certain amount of additional FEC code based on the request from the receiver device.

6. The communication device of claim 5, wherein the processor analyzes the request to determine the certain amount of additional FEC code for restoring a certain number of errors in the stream of data packets.

7. The communication device of claim 5, wherein the processor analyzes the request to determine the re-transmission of certain data packets in a unicast.

8. A receiver device of a communication system, the receiver device comprising:

a buffer for receiving and storing a stream of data packets and forward error correction (FEC); and a processor in communication with the buffer, the processor configured to access the data packets and FEC from the buffer and determine whether or not data packets have been dropped or received with errors;

wherein, when it is determined that data packets have been dropped or received with errors, the processor is configured to determine whether or not the FEC is sufficient to restore the dropped or faulty data packets; and wherein, when the FEC is not sufficient to restore the dropped data packets, the processor is configured to send a request for additional FEC, the processor being further configured to wait a predetermined amount of time for a first transmitting device of the communication system to receive the request and transmit additional FEC to the buffer.

9. The receiver device of claim 8, wherein the predetermined amount of time is related to a round-trip time for a signal to propagate between the first transmitting device and the receiver device.

10. The receiver device of claim 9, wherein the predetermined amount of time is further related to an amount of time for the buffer to store the stream of data packets and for the processor to determine whether or not the FEC is sufficient.

11. The receiver device of claim 8, wherein data packets are received on a first multicast and the FEC is received on a second multicast.

12. The receiver device of claim 8, wherein the buffer receives data packets from a second transmitting device.

13. The receiver device of claim 12, wherein the first transmitting device is associated with one of: a multicast group unrelated to the second transmitting device; or a file transfer protocol (FTP) exchange.

14. The receiver device of claim 8, wherein, if the buffer does not receive additional FEC after the processor waits for the predetermined amount of time, the processor attempts to use any received FEC to restore the dropped data packets as much as possible.

15. A method comprising:

temporarily storing data packets and forward error correction (FEC) associated with the data packets;

waiting for a period of time to determine whether a number of the data packets or a portion of the FEC are to be transmitted;

determining whether or not detected errors in the data packets are below a first determined threshold; and allowing the portion of the FEC to be transmitted when the detected errors are below the first determined threshold.

16. The method of claim 15, further comprising:

determining whether or not detected errors in the data packets are below a second determined threshold, the second determined threshold being higher than the first determined threshold; and allowing one or more data packets to be transmitted when the detected errors are below the second determined threshold.

17. The method of claim 16, wherein the first and second determined thresholds are predetermined.

18. The method of claim 15, wherein, after waiting for the period of time and determining that a number of the data packets or a portion of the FEC are not to be transmitted, allowing the data packets to be transmitted down the communication system with uncorrected errors.

* * * * *